INVENTOR
Kenneth H. Miller
BY Thomas G. Harwood
ATTORNEY

United States Patent Office 3,418,480
Patented Dec. 24, 1968

3,418,480
LIGHTING CONTROL CIRCUIT EMPLOYING PHOTOCELLS AND GAS DIODES TO OPERATE SEMICONDUCTOR SWITCHES
Kenneth H. Miller, 1607 Westmoore,
Austin, Tex. 78723
Filed Oct. 19, 1965, Ser. No. 497,994
18 Claims. (Cl. 250—208)

This invention relates to a circuit for controlling electrical power supplied to a load. More particularly, it relates to a control circuit utilizing a photoconductive device responsive to daylight to control electrical power to a load, such as, for example, street lights, wherein the street lights are automatically turned on at sundown and automatically cutoff at sunrise.

Many control circuits have been devised to control electrical power to a load in response to daylight such as, for example, circuits that will control electrical power to turn on one or more lights in response to daylight decreasing below a certain intensity, or upon sundown, and the turning off of the light automatically in response to increasing sunlight, or at sunrise. Most, if not all, of these control circuits utilize a photoconductive cell of some type that is responsive to the daylight, or the absence thereof, to vary its resistive characteristics accordingly and control the rest of the circuit. While some of these control circuits are reasonably reliable, it has been generally found that they are relatively expensive so that the use thereof in many applications has been somewhat limited. On the other hand, those circuits which are inexpensive enough to use in most applications have been generally found unreliable in some respects. Moreover, many, if not all, of these control circuits utilize one or more mechanical devices as switches which are controlled in response to the photoconductive cell impedance, which mechanical switches are subject to wear and malfunction.

It is a broad object of this invention to provide a control circuit which is responsive to daylight to control electrical power supplied to a load. More specifically, it is another object to provide such a control circuit employing a detecting photoconductive device that is inexpensive to manufacture and contains no mechanical devices that are subject to wear or malfunction, while at the same time providing complete reliability. Although such a control circuit has a primary application to the control of lights to be turned on at sundown and to be turned off automatically at sunrise, such as street lights, for example, it has many other applications as will become readily apparent.

In its application to street lamps, which are often of the mercury vapor type, it is important that the control circuit used therewith maintain the lamps once they have been turned on even when an artificial light is momentarily incident on the detecting photocell within the control circuit. For example, lightning or automobile lights incident on the photocell at night are sometimes of sufficient intensity to raise the photocell resistance above the cutoff level. The problem arises in using mercury vapor lamps, which have the characteristic of coming on dim initially until the vapor pressure builds up, at which time they will be bright. Should there be a momentary power failure after the lamps are turned on, so that the lamps are turned off, the lamps will not come back on even with an immediate reapplication of power, since the lamps must cool down to reduce the vapor pressure to a sufficiently low level in order to strike again and become lit. The time required for the lamps to cool sufficiently can be as long as two to three minutes, and it is obviously undesirable to result in a loss of lights for this length of time. Then it is another object to provide a street lamp control that not only prevents the turning off of mercury vapor lamps but prevents the turning off of any lamps used therewith when a light is incident only momentarily on the detecting photocell, and which prevents the turning off of the lights until the light striking the photocell has been continuously incident thereon for a considerable length of time.

The mode of initially turning on street lamps of this type is also important, since the lamps represent an inductive load by virtue of the ballast used therewith. Moreover, these lamps are most commonly energized by an AC voltage source (as contrasted to DC). It is undesirable to phase advance or retard as a means of applying or removing power during the turn on period. If this occurs, initial lamp striking or starting may be adversely affected, or in case of phase shifting unequally on either side of the AC component, a DC current component will be supplied through the inductive load which may either damage it or cause it to burn up. This problem occurs, as just noted, when the lamps are initially turned on, whereby the detecting photoconductive device responds to a light intensity, with possible variations thereof, just at the predetermined turn-on level. However, this intensity may vary slightly either above or below the turn-on level, or the alternating supply voltage may be caused to vary up and down at this time, either of which can cause phasing of the lights on and off. Thus another object of the invention is to provide a control circuit which causes a positive turn on of the street lights at any time the light intensity falls below a predetermined level, and which precludes the phasing on and off during the initial cut-on period.

In accordance with the above-stated objects, the present invention utilizes a photoconductive cell which is responsive to light incident thereon, or the absence thereof, to change its resistive characteristics accordingly, and which functions to determine when electrical power is to be applied to the load by the circuit. The change in resistive characteristics of the photoconductive cell is used to cause the switching on or off of solid-state power switching devices, such as, for example, semiconductor controlled rectifiers or other devices. To effect this type of switching in the preferred embodiment of the invention, a photoconductive device is connected in parallel with a light source of the threshold type with the photoconductive device and light source being optically shielded from one another. The light source is connected across the power lines to be energized thereby. When daylight of an intensity above a predetermined magnitude is incident on the photoconductive device, its resistance is low and shunts the current from the power lines around the light source. However, as the incident daylight decreases in intensity below this predetermined magnitude, the voltage across the light source will reach the threshold value to cause it to ignite or burn, which light is directed onto another photoconductive device which is connected to the power controlled switching devices. When light strikes the second photoconductive device, its resistance will change and cause the switching on of the power control switches. The second photoconductive device is also optically shielded from any light other than that from the light source actuated in response to the first photoconductive device. To preclude the turning off of the lamp load after it has once been turned on when outside light is only momentarily incident on the first photoconductive device, another embodiment of the invention employs a photoconductive device to turn on the solid-state switches in response to light from the light source within the circuit which is characterized by a memory. The nature of this memory is such that the resistance of the photoconductive device remains low for a period of time (up to two to five minutes, for example) after the incident light thereon has been removed. Thus it will continue to actuate the solid-state switches to maintain the lamps on.

In another embodiment of the invention, another means is utilized to maintain the threshold lamp on for a predetermined time even after the detecting photoconductive device responds to external light of sufficient intensity that would ordinarily cause the street lights to be turned off, thus providing an effective memory for the circuit. In yet another embodiment, means are employed for providing this effective memory while also providing the function of eliminating the phasing on of the street lights during the initial turn on period. To provide just the memory function (other than the memory of the second photoconductive device itself), the invention employs, in one embodiment, a thermister type device connected in parallel with the threshold lamp within the circuit, which thermister has an inherent thermal lag or inertia. To provide both the memory and to preclude phasing on, the invention employs, in another embodiment, a capacitive device to maintain the voltage across the threshold lamp above its operating voltage for a predetermined period of time.

Many other objects, features and advantages will become readily apparent from the following detailed description of the invention when taken in conjunction with the appended claims and the attached drawing wherein:

Figure 4:
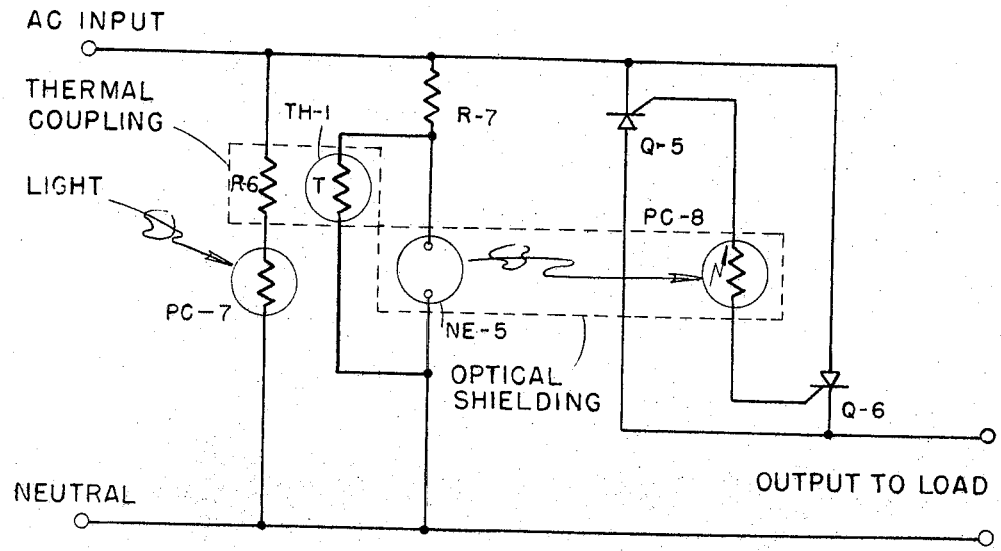
Figure 5:
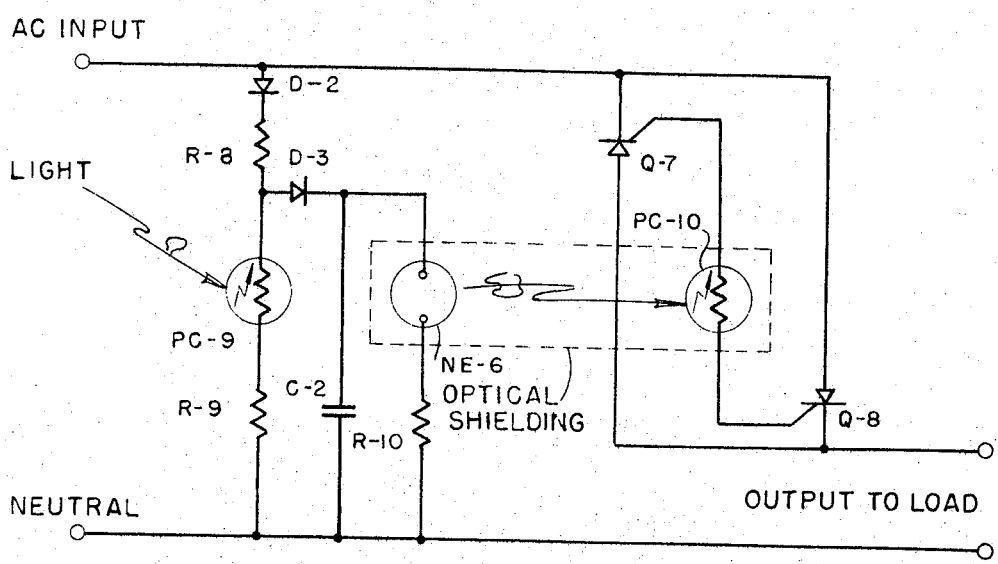

FIGURE 4 is an electrical schematic diagram of still another embodiment of the invention employing a thermister to provide a memory to prevent turning off the street lights when an outside light is momentarily incident on the detecting photocell; and FIGURE 5 is an electrical schematic diagram of another embodiment which employs a capacitor to provide a memory and which also acts to provide a positive turn on of the street lights so as to prevent phasing them on.

Figure 1:
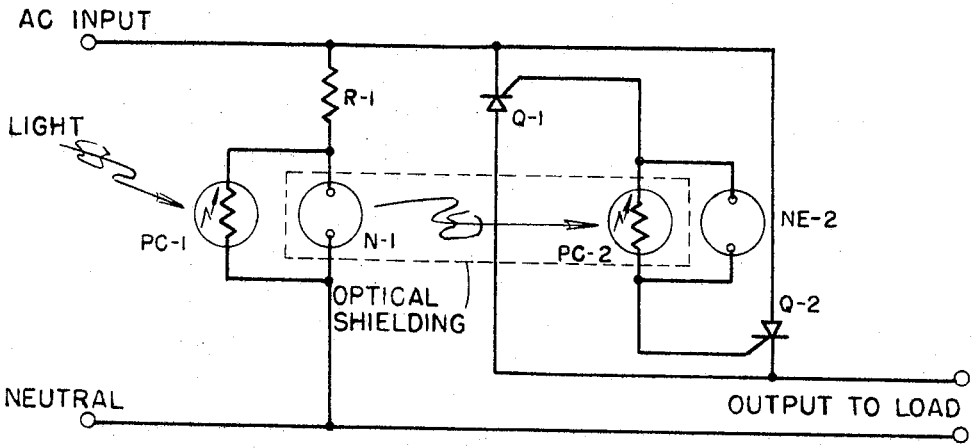
FIGURE 1 is an electrical schematic diagram of one embodiment of the invention utilizing a pair of semiconductor controlled rectifiers to provide full wave power control to a load from an AC voltage source.

Referring to FIGURE 1, which is an electrical schematic diagram of one embodiment of the control circuit of this invention and which is primarily applicable to the controlling of power to street lights, a first photocell PC-1 is disposed to receive and detect the intensity of light external to the circuit, or daylight. A series combination of a resistor R-1 and a neon lamp NE-1 is connected across an AC voltage source between the AC input and the neutral line. Photoconductive member PC-1 is connected directly across the neon lamp NE-1 to act as a shunt thereacross. Optically coupled to neon lamp NE-1 is a second photoconductive device, or photocell PC-2, wherein lamp NE-1 and cell PC-2 are optically isolated from the rest of the circuit but are optically coupled together. The second cell PC-2 is connected at one terminal to the gate of a first semiconductor controlled rectifier Q-1 and at the other terminal to the gate of a second semiconductor controlled rectifier Q-2. Controlled rectifiers Q-1 and Q-2 are connected in parallel with opposite polarities, as shown, and this parallel combination is connected in series with the load (e.g. street lights) and the AC voltage source. The opposite polarities of the controlled rectifiers is for the purpose of providing full wave power control to the load. The nature of the semiconductor controlled rectifier is commonly known as a unidirectionally conducting device and will not be elaborated on here. It will be noted, however, that it is a device which has a stable, high impedance state and can be caused to switch to a stable, low impedance state with a current pulse applied to the gate thereof in the presence of a positive voltage applied to the anode with respect to the cathode. It is switched back to the high impedance state when the current through the device drops below a certain level called holding current. This is only one of several solid-state devices that can be used as a power switch, wherein other devices will be described later for use with the control circuit of the invention.

During the daytime when light of intensity exceeding a predetermined level is incident on cell PC-1, the resistance of the cell will be relatively low and cause lamp NE-1 to be shunted. That is to say, although the lamp is connected across the power lines which, by selecton of the proper magnitude of resistor R-1, is of sufficient voltage to cause the lamp to ignite by exceeding the threshold voltage, this voltage is never attained across the lamp so long as cell PC-1 acts as a shunt. As the intensity of the incident light decreases below a predetermined level as set by resistor R-1, neon lamp NE-1 and cell PC-1, the resistance of cell PC-1 increases to a magnitude sufficient to allow the voltage across the lamp NE-1 to exceed the threshold voltage thereof. At this time, the lamp will ignite and direct light onto the second photocell PC-2 to cause the resistance of the latter to decrease. In order to supply electrical energy to the load through either one of the controlled rectifiers Q-1 or Q-2 during the respective half cycles of the AC voltage source, these devices must be gated on by applying a current pulse to the gates thereof. When the resistance of cell PC-2 is lowered in response to incident light thereon from lamp NE-1, a current sufficient to gate the SCR's to the low impedance state flows from the power lines through photocell PC-2 and the gate-cathode diodes of the controlled rectifiers. In this event, one controlled rectifier will conduct during one half of the alternating current cycle and the other will conduct during the other half cycle. Power is therefore supplied through the controlled rectifiers to the output load. It will be readily apparent that as the external light intensity increases, such as will be the case during the daytime, lamp NE-1 is again shunted by cell PC-1, thus removing the gating signal from the controlled rectifiers as a result of the increase in resistance of photocell PC-2.

The characteristics of a neon lamp are well known, such as the threshold voltage and voltage required to sustain conduction once the threshold voltage has been attained. Similarly, the characteristics of photoconductive devices are well known, so that the magnitude of resistor R-1 and the particular device PC-1 can be readily calculated by those skilled in the art to achieve turn-on of the street lights, or energization of the load, at the desired external light intensity. Likewise, the various characteristics of semiconductor controlled rectifiers are well known and readily available in order to properly select the particular device PC-2 to be used, and thus specific parameters will not be given here.

During the time when power is being supplied to the load, any extraneous light of sufficient intensity incident on photocell PC-1 will cause neon lamp NE-1 to turn off, assuming the resistance of PC-1 decreases sufficiently so that the voltage across NE-1 falls below the minimum sustaining voltage. Should this extraneous light persist for a sufficient length of time, the resistance of cell PC-2 will rise to a magnitude to reduce the current flow therethrough below the gating current for devices Q-1 and Q-2, thus turning off the power to the load. Once this occurs in the case of mercury vapor lamps as the load, they cannot be turned on again without a substantial time delay, even upon the immediate reapplication of supply voltage thereto. As mentioned above, this results from the fact that the lamps must cool to a temperature where the vapor pressure is reduced sufficiently, and the time lag between turn-off and turn-on can be as much as several minutes. To eliminate this problem, the invention employs, in one embodiment, a photocell PC-2 which is characterized by a memory. For example, it is known that photocells, such as those comprised of cadmium-sulfide (CdS), cadmiumselenide (CdSe), zinc-sulfide (ZnS), zinc-selenide (ZnSe) and mixtures thereof, inherently have a memory, wherein the duration of this memory is controlled by the exact materials and process used. That is to say, once the photocell has been illuminated to reduce its resistance, the resistance will remain at a reduced magnitude for a period of time after the removal of the light incident thereon. However, this effect and time lag is not desired in most applications, and this effect is usually reduced to a minimum in conventional photocells, wherein the typical memory is in the order of less than one second. This is not sufficiently long to maintain the lamp load on in some street light control applications. For example, when the control is used in a location where flashing display signs or automobile lights are repeatedly displayed on the circuit for several seconds during each occurrence, the lamps would be turned off. It is known, however, that photocells can be manufactured from conventional materials which have memories far in excess of one second, which manufacture involves a special process of impurity doping, among others, and which processes form no part of this invention. For example, cells can be manufactured with memories far in excess of that actually required in most applications of street light controls. Specifically, a cell with a minimum memory time of three seconds is suitable for most applications and the use of such cells are contemplated as an improved embodiment of the present invention.

In its application to the automatic control of street lights, the control circuit is preferably protected from damage in the case of wide fluctuation of line voltages. It is not uncommon that a disturbance in the supply line remote from the street lamps actually being controlled can cause a large magnitude voltage transient or pulse to be applied to the controlled rectifiers. This transient, high voltage peak can easily damage the controlled rectifier switching devices if they are not gated to a conduction state, as is the case during the daytime, whereas the relatively high currents that they can conduct to prevent a large voltage pulse from building up will normally cause no damage, as is the case during the night. To provide overvoltage protection for the controlled rectifiers during the daytime when they are not conducting, another neon lamp NE-2 can be connected between the two gates of the controlled rectifiers in parallel with cell PC-2. Upon the occurrence in the supply line of voltage transients of this nature, this voltage will be applied across the second lamp NE-2 through the gate-cathode diodes of the controlled rectifiers. Should the voltage reach a predetermined magnitude as determined by the characteristic of NE-2, which magnitude would be considered the maximum safe level, lamp NE-2 will break down to allow a current flow through the gates of the SCR's sufficient to cause them to be switched to the low impedance state and to conduct. Thus instead of allowing a very large voltage transient to develop across the controlled rectifiers, they are made to conduct in response thereto to maintain a safe voltage level. In addition, the inherent capacitance of photocell PC-2 also provides the same type of protection for the controlled rectifiers, so that the use of lamp NE-2 is optional only to insure the degree of protection desired.

It has been noted that other solid-state static switching devices can be used other than the semiconductor controlled rectifiers shown in the circuit of FIGURE 1. To illustrate this, another embodiment of the invention is shown in the electrical schematic diagram of FIGURE 2, wherein a cell PC-3, resistor R-2 and neon lamp NE-3 are connected as previously described. Similarly, a cell PC-4 is used in conjunction with neon lamp NE-3 exactly as before and is optically coupled thereto, with lamp NE-3 and cell PC-4 again being optically isolated from the rest of the circuit. This circuit differs from the circuit shown in FIGURE 1 in the use of a different type of power control device, wherein a five-layer, symmetrical semiconductor device Q-3 known as a silicon symmetrical switch is used. This device is normally in a high impedance state, but when a voltage in excess of its maximum blocking voltage capability is applied, a current multiplying effect takes place. The device then switches to a conductive state, whereby it has a very low voltage drop while conducting current, and will remain in this state until the current through it drops below a specific level referred to as holding current. This switch is connected in series with the AC power source and load through the secondary of a transformer T-1, as shown. Device Q-3 has a stable, high impedance state and can be caused to switch to a stable, low impedance state by the application thereacross of a voltage pulse having either a sufficient amplitude or a sufficiently fast rate of rise, depending upon how Q-3 is designed. Cell PC-4 is connected to the AC voltage source through resistor R-3 and in series with the load through capacitor C-1. When the resistance of cell PC-4 is decreased in response to light incident thereon, capacitor C-1 begins to charge toward the line voltage. Connected in parallel with capacitor C-1 is the series combination of the primary of transformer T-1 and a triggering device D-1 that will affect the rapid discharge of capacitor C-1 when the voltage thereacross attains a predetermined magnitude. Any suitable device can be used for D-1 which will rapidly discharge capacitor C-1 at the proper voltage. A device known as a General Electric Company DIAC, or the equivalent of a Texas Instruments Incorporated PNP trigger, is shown for D-1 in FIGURE 2, wherein this type of device is a symmetrical NPN transistor that is capable of conducting in either direction according to the polarity of voltage. Only a small current will flow through the device until the voltage attains a predetermined magnitude, at which time the voltage drops across the device with a corresponding rapid increase in current flow. This will rapidly discharge capacitor C-1 to the sustaining voltage of device D-1 through the primary of transformer T-1, which produces a voltage pulse at the secondary of the transformer applied across power switch Q-3. Consequently, device Q-3 will be switched to its low impedance state to supply power to the load. The characteristics of all the devices shown are well known, and consequently, the various values and parameters of the circuit can be readily calculated and will not be given here.

Figure 2:
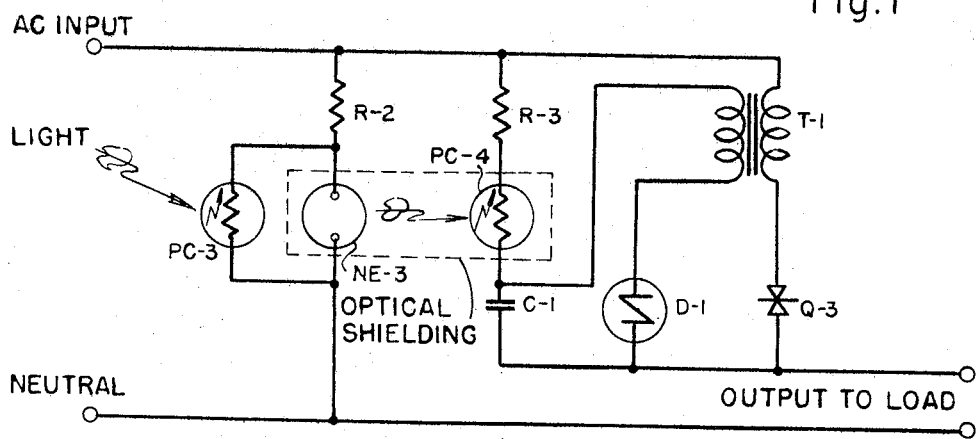
FIGURE 2 is an electrical schematic diagram of another embodiment of the invention utilizing a five-layer symmetrical semiconductor switching device for controlling the power to a load.

It is apparent that both circuits described thus far effect full wave power control to the load. Thus in FIGURE 1, a gating signal is generated for device Q-1 during one half cycle, and a similar gating signal is generated for device Q-2 during the other half cycle. In FIGURE 2, capacitor C-1 charges positively during one half cycle and delivers a positive pulse to switch device Q-3 during this half cycle, whereas C-1 is fully discharged at the beginning of the next half cycle and is charged negatively to apply a negative pulse to switch Q-3 during this next half cycle. The nature of Q-3 is that it is symmetrical and can conduct bidirectionally, thus effecting full wave power control to the load. It will also be noted that photocell PC-4 can also be characterized by a suitable memory to achieve the same results as described earlier for FIGURE 1.

Figure 3:
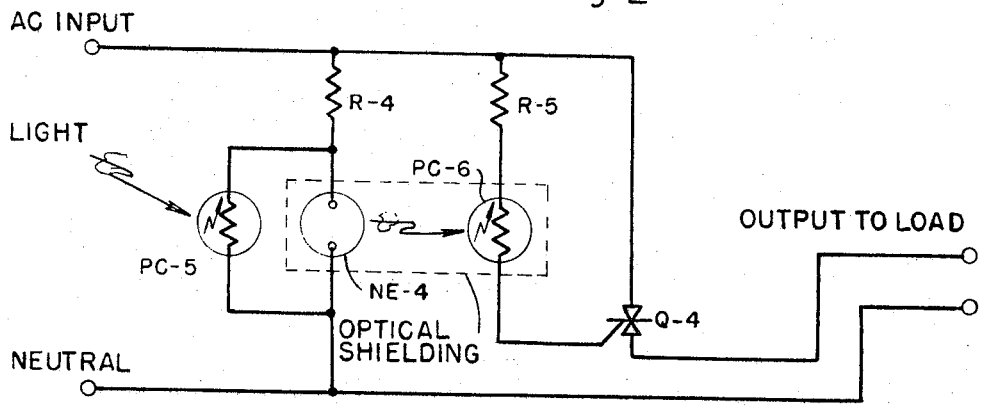
FIGURE 3 is an electrical schematic diagram of yet another embodiment of the invention utilizing a five-layer gated power switching device known as a TRIAC for switching the power to an output load.

A further embodiment of the invention is shown in the electrical schematic diagram of FIGURE 3, wherein a cell PC-5, lamp NE-4 and resistor R-4 are connected as previously shown. Similarly, a cell PC-6 is used in conjunction with lamp NE-4, wherein these two are optically coupled together but optically shielded from the rest of the circuit. This particular embodiment uses a yet different static power switch Q-4 which, although similar to Q-3, utilizes a gate to switch it from the high impedance state to the low impedance state. This device is commonly known as a General Electric Company TRIAC and is more adequately described as a multilayer semiconductor device with two steady-state conditions, namely a high impedance state whereby the device will not conduct in either direction and a conducting or low impedance state wherein it will conduct large amounts of current in either direction. Being a bidirectional device (as opposed to SCR's being unidirectional), only one device is required to handle full wave AC power control. The device may be switched from non-conducting to the conducting state by applying a voltage greater than maximum blocking voltage in either direction or by applying a signal (either positive or negative) to a control element or gate. The nature and operating characteristics of power switch Q–4 is such that regardless of the polarity of voltage thereacross, the device can be made to switch to the low impedance state by the application to the gate thereof of a current pulse. To cause device Q–4 to switch to the low impedance state when light generated by lamp NE–4 is incident on cell PC–6, cell PC–6 is connected between the gate of power switch Q–4 and the AC voltage line through resistor R–5. When the resistance of cell PC–6 is reduced in response to light incident thereon, this will allow a current (either positive or negative as determined by the particular half cycle of the power source) to be applied to the gate through resistor R–5, thus causing device Q–4 to switch. This switch, as already noted, is symmetrical and can be caused to switch with either a positive or negative current to the gate, so that Q–4 conducts bidirectionally for full wave power control.

The provision of a photocell having a suitable memory for actuating the solid-state static switches to energize the load has been described with reference to eliminating the problem of the lights being turned off at night when an external light is momentarily displaced on the detecting photocell. This same problem can be solved and eliminated by means other than a photocell having a memory, wherein another embodiment of the invention, as shown in FIGURE 4, employs a different means for accomplishing the same results. Referring to the electrical schematic diagram of FIGURE 4, a detecting photocell PC–7 is connected across the AC voltage lines in series with a heating resistor R–6. Also connected across the AC voltage lines is a neon lamp NE–5 connected in series with a current limiting resistor R–7, and connected in parallel with the neon lamp is a device TH–1 whose resistance varies as a function of temperature thereof. As shown in FIGURE 4, a thermister TH–1 is used for this purpose, wherein the resistance thereof decreases as the temperature increases. Connected in series with the load and the AC voltage line is the parallel combination of two semiconductor controlled rectifiers Q–5 and Q–6 connected with opposite polarities to give full wave power control. Connected between the gates of the two controlled rectifiers is another photocell PC–8 for gating the controlled rectifiers as previously described. Neon lamp NE–5 and photocell PC–8 are optically coupled together but are optically shielded from the rest of the circuit.

During the daytime when the light incident on photocell PC–7 is above a predetermined intensity, a current flows through resistor R–6 heating it to a temperature considerably above any normal ambient temperature. This resistor R–6 is appropriately mounted so that its heat is coupled to thermister TH–1 for maintaining the latter at a like temperature considerably above any normal ambient temperature. Thermister TH–1 is chosen so that at this elevated temperature, its resistance is low enough that NE–5 is effectively shunted and will not light. As external light on photocell PC–7 decreases below the predetermined intensity level, the current through heating resistor R–6 reduced until a negligible amount of heat is produced, and consequently, R–6 cools to approximately the prevailing ambient temperature. As R–6 cools, so does thermister TH–1 since they are thermally coupled. As thermister TH–1 cools, its resistance increases so that more and more voltage is applied across NE–5 until it ignites, at which time the neon light will be displayed on photocell PC–8 causing the controlled rectifiers to switch. This function of the circuit is quite similar to that previously described.

When light is reapplied to photocell PC–7, it allows current to again flow in R–6 and heating to again occur. If this external light incident on PC–7 is applied for a short time (for example, less than 30 seconds), resistor R–6 will have begun to heat, but since there will be a conderable mass thermal inertia to heat, including the mass of R–6 itself, the mass of the heat coupler, and the mass of thermister TH–1, the net heat rise in this mass will have been negligible, and the thermister will still be too cold to effectively shunt NE–5. Should PC–7 see a sustained light such as the dawn sky, R–6 will in time heat the aforementioned mass and cause thermister TH–1 to heat sufficiently to drop to a sufficiently low impedance that it will shunt NE–5, such that the voltage across NE–5 will drop below its sustaining level. Light NE–5 then goes out, allowing PC–8 to return to its high imepdance value, and Q–5 and Q–6 will turn off the load current.

The value of R–6 is chosen such that photocell PC–7 is not overdissipated in itself in switching the current to it, but that it generates enough heat to do its required function. The value of thermister TH–1 is chosen so that its impedance at the proper temperature extremes causes NE–5 to positively turn on and off. Another consideration is that the outdoor ambient at some locations will be perhaps 20° below zero Fahrenheit in winter, and summer temperatures of 120° Fahrenheit would not be unusual. The heating function must be sufficient to do its job at the coldest extremes, and the thermister is chosen so that it gets cool enough when the ambient reaches its highest extremes. With readily available commercial devices and with proper calculations by those skilled in the art, these conditions can be readily satisfied.

It was mentioned that it is sometimes a problem in initially turning on the street lamps just at sundown or at the desired daylight intensity. The problem arises because of the tendency to phase on the street lamps as contrasted to a positive turn-on action. This problem results only in the use of AC voltage to energize the load, wherein a DC component can be generated as a result of phasing on which can damage the load. To eliminate this effect, another embodiment of the invention shown in the electrical schematic diagram of FIGURE 5 utilizes means for maintaining the neon lamp on during the initial turn-on period. Moreover, the means utilized also effects the same results as would be the case of providing the photocell which is optically coupled to the neon lamp with a memory. As shown in FIGURE 5, a neon lamp NE–6 is connected across the AC voltage line in series with diodes D–2 and D–3, resistor R–8 and resistor R–10. Diode D–2 is connected at its anode to the AC input line so that it conducts only during the positive half of the alternating cycle, and is necessary only if cell PC–9 is polarity sensitive which it is usually not. A capacitor C–2 is connected in parallel with the series combination of resistor R–10 and neon lamp NE–6, and a series combination comprising a detecting photocell PC–9 and resistor R–9 is connected in parallel with the combination comprising diode D–3 connected in series with the parallel combination of capacitor C–2 and the series connected lamp NE–6 and resistor R–10. A pair of semiconductor controlled rectifiers Q–7 and Q–8 are connected in parallel with each other in opposite polarities and are connected in series with the AC voltage line and the load. Another photocell PC–10 is connected between the gates of the controlled rectifiers and is optically coupled to neon lamp NE–6, whereby the neon lamp and photocell are optically isolated from the rest of the circuit.

Capacitor C–2 is normally quite large to achieve the desired time constant, all of which will be described below; and consequently, an electrolytic capacitor is normally used to achieve this high capacity. Because of the polarity of diode D–3, however, the capacitor is protected and is charged only during the positive half cycle of the AC voltage.

During the initial turn-on period of the lamps when the external light incident on detecting photocell PC-9 has decreased to about the predetermined turn-on level, its resistance will increase accordingly and thus the voltage across capacitor C-2 will increase accordingly. The time constant comprising resistor R-8 and capacitor C-2 is small enough so that capacitor C-2 is charged to this increased voltage in a very short period, and in fact, recharges the capacitor to the increased voltage each half cycle in a time much shorter than one half cycle of the alternating voltage. As this voltage increases, neon lamp NE-6 will also be caused to strike and thus cause gating of the controlled rectifiers through photocell PC-10. should the intensity of light incident on the detecting photocell PC-9 increase thereafter during this initial turn-on period, the voltage across capacitor C-2 cannot decrease instantaneously but will continue to supply current to lamp NE-6 to sustain a sufficient voltage to operate the lamp. Thus the neon lamp is not turned off instantaneously. In fact, current is conducted through diode D-2 and the neon lamp from the AC voltage line only during the positive half cycle, whereas capacitor C-2 supplies current to the neon lamp also during the negative half cycle. It will now be apparent that the time constant for discharging capacitor C-2 through resistor R-10 must be much larger than the time constant required to charge the capacitor through resistor R-8. In fact, this time constant can be made very large by making the value of capacitor C-2 and resistor R-10 very large. Therefore, capacitor C-2 not only causes the neon lamp to continue to conduct during the negative half cycle but will also cause it to conduct for a period of time even when the resistance of the detecting photocell PC-9 has been decreased in response to light incident thereon. It will also be apparent that capacitor C-2 provides the effective function of a memory for photocell PC-10 for the same reason. That is to say, capacitor C-2 will continue to supply current to the lamp NE-6 to maintain a sufficient voltage thereacross even though an external light is momentarily displayed on cell PC-9.

The parameters of the circuit can be readily calculated by those skilled in the art from the foregoing functional description. Thus resistor R-8 is small enough to allow a sufficiently large charge to be placed on capacitor C-2 during a single half cycle (or a shorter period of time) of the alternating line voltage, whereas resistor R-10 is large enough to prevent a substantial discharge of capacitor C-2 during a single half cycle. Diode D-3 is connected in the circuit as shown to block any current flow from capacitor C-2 during the discharge thereof through photocell PC-9, so that the only discharge path is through neon lamp NE-6. This insures the desired time constant of the circuit.

Throughout the foregoing descriptions of the various embodiments of the inventions, reference has been made to particular devices for performing the various functions desired. It should be understood, however, that many alternative and different devices may be employed to carry out these functions to achieve the same or even improved results. For example, reference has been made to several different devices which may be employed as the power switch or switches to control the power to the load. In addition to these modifications, different devices can be used to take the place of the switching photocell converted to the power switches, for example. For the sake of clarity, reference will be had only to the circuit shown in FIGURE 5 to illustrate the use of different devices, although it will be understood that these considerations also apply to the other embodiments.

Use of a photocell, such as comprised of cadmium-sulfide, for the switching photocell PC-10 requires the use of semiconductor controlled rectifiers Q-7 and Q-8 which are responsive to relatively small gate currents to effect switching from the high to the low impedance state. A photocell of this nature usually has a resistance of a few thousand ohms when activated with light, or optical radiation, and considering this resistance in conjunction with the line voltage applied across the controlled rectifiers, a gate current of only a few milliamperes is available for switching the controlled rectifiers. Especially this is true during the initial part of each half cycle of the AC line voltage. Semiconductor controlled rectifiers (or other devices) characterized by a switching current of this small magnitude may or may not be as readily available as those less sensitive, although this should not be construed that such devices are not available at all. Since it may be desirable to utilize a less sensitive power control switch, a different device can be used to replace cell PC-10. As one example only, a PNPN light activated silicon device can be used to replace cell PC-10, wherein such a device functions with an inherent current multiplication or amplification effect to provide, or allow, a greater gate current for switching the controlled rectifiers. Other semiconductor junction devices will also occur that can be used to take advantage of this effect, so that less sensitive (and perhaps less expensive) power switches can be used. Such devices and their functions are commonly known and will not be described in detail here, wherein many of such devices are fully described in the General Electric Company SCR Manual.

Other modifications and substitutions that do not depart from the true scope of the invention will undoubtedly occur to those skilled in the art, and therefore, it is intended that the invention be limited only as defined in the appended claims.

What is claimed is:

1. A control circuit for controlling the electrical power supplied to a load from a source of AC voltage, comprising:
    (a) optical radiation source means for being connected across said source of AC voltage activated responsive to a minimum threshold voltage applied thereacross,
    (b) switch means having conduction electrodes for being connected in series with said source of AC voltage and said load,
    (c) first optical radiation sensitive means optically coupled to said optical radiation source means and connected to said switch means for causing said switch means to conduct responsive to optical radiation incident thereon from said optical radiation source means, and
    (d) second optical radiation sensitive means connected in electrical shunting relation with said optical radiation source means for controlling the voltage applied across said optical source means from said source of AC voltage as a function of the optical radiation incident thereon.

2. A control circuit according to claim 1 wherein said second optical radiation sensitive means is optically shielded from said optical radiation source means.

3. A control circuit according to claim 2 wherein said first optical radiation sensitive means and said optical radiation source means are optically shielded from external optical radiation, and said second optical radiation sensitive means is exposed to external optical radiation.

4. A control circuit for controlling the electrical power supplied to a load from a source of AC voltage, comprising:
    (a) a threshold voltage light source for being connected across said source of AC voltage,
    (b) switch means having conduction electrodes for being connected in series with said source of AC voltage and said load,
    (c) a first photocell optically coupled to said light source and connected to said switch means for controlling the condition of said switch means in response to light incident thereon from said light source, and
    (d) a second photocell connected in parallel with said light source for controlling the voltage applied across said light source from said source of AC voltage as a function of external light incident thereon.

5. A control circuit according to claim 4 wherein said second photocell is optically shielded from said light source and said first photocell is optically shielded from external light.

6. A control circuit according to claim 1 wherein the impedance of said first optical radiation sensitive means varies as a function of the intensity of optical radiation incident thereon.

7. A control circuit according to claim 1 wherein said first optical radiation sensitive means is characterized by an impedance of normally high magnitude which decreases as a function of the intensity of optical radiation incident thereon, and which impedance magnitude remains decreased below said normally high magnitude by a predetermined amount for a predetermined time after the removal of said incident optical radiation, and said switch means is caused to conduct when said impedance is decreased below said normally high magnitude by said predetermined amount.

8. A control circuit according to claim 7 wherein said predetermined time is equal to or greater than three seconds.

9. A control circuit according to claim 7 wherein said first optical radiation sensitive means comprises a photocell characterized by a memory.

10. A control circuit according to claim 1 wherein said switch means is caused to conduct when an electrical characteristic of said first optical radiation sensitive means is altered, and said electrical characteristic is altered in response to optical radiation incident on said first optical radiation sensitive means and remains altered for a predetermined period of time after the removal of said incident optical radiation.

11. A control circuit for controlling the electrical power supplied to a load from a source of AC voltage, comprising:
(a) optical radiation source means for being connected across said source of AC voltage which is voltage responsive for generating optical radiation,
(b) switch means having conduction electrodes for being connected at said conduction electrodes in series with said source of AC voltage and said load, and responsive to a control signal for being rendered conductive,
(c) first optical radiation sensitive means optically coupled to said optical radiation source means and connected to said switch means for producing said control signal applied to said switch means responsive to optical radiation incident thereon from said optical radiation source means, and
(d) second optical radiation sensitive means connected in electrical shunting relation with said optical source means for controlling the voltage applied across said optical source means from said source of AC voltage as a function of external optical radiation incident thereon.

12. A control circuit according to claim 11 wherein said first optical radiation sensitive means continues to produce said control signal for a predetermined period of time after said optical radiation incident thereon from said optical radiation source means is removed.

13. A control circuit for controlling the electrical power supplied to a load from a source of AC voltage, comprising:
(a) a threshold voltage light source for being connected across said source of AC voltage,
(b) a thermistor connected in parallel with said light source for shunting said light source to reduce the voltage thereacross below the threshold value when heated above the ambient temperature,
(c) switch means having conduction electrodes for being connected in series with said source of AC voltage and said load,
(d) a first photocell optically coupled to said light source and connected to said switch means for controlling the conduction of said switch means in response to light incident thereon from said light source,
(e) a second photocell for being connected across said source of AC voltage, and
(f) a resistor thermally coupled to said thermistor connected in parallel with said second photocell for heating said thermistor in response to current conducted thereby when external optical radiation is incident on said second photocell.

14. A control circuit according to claim 11 wherein said switch means comprises a pair of semiconductor controlled rectifiers connected at the conduction electrodes thereof in parallel with opposite polarities and for being connected at said conduction electrodes in series with said source of AC voltage and said load, and said first optical radiation sensitive means is connected between the control electrodes of said pair of semiconductor controlled rectifiers.

15. A control circuit for controlling the electrical power supplied to a load from a source of AC voltage, comprising:
(a) a capacitor for being connected across said source of AC voltage for being charged thereby,
(b) a threshold voltage light source connected in parallel, with said capacitor activated by discharge current flow from said capacitor when said capacitor is charged to a voltage above the minimum threshold voltage of said light source,
(c) a first photocell connected in shunting relation with said light source responsive to external light of a predetermined minimum intensity incident thereon to reduce the voltage charging said capacitor to below said minimum threshold voltage of said light source,
(d) switch means having conduction electrodes for being connected in series with said source of AC voltage and said load, and
(e) a second photocell optically coupled to said light source and connected to said switch means for controlling the conduction of said switch means in response to light incident thereon from said light source.

16. A control circuit according to claim 15 including a first resistor connected in series with said capacitor through which said capacitor is charged, a second resistor connected in series with said light source through which said capacitor is discharged, and a diode connected between said capacitor and said first photocell to prevent the discharge of said capacitor through said first photocell.

17. A control circuit according to claim 16 wherein the time constant of the charging circuit comprising said first resistor and said capacitor is smaller than the time constant of the discharge circuit comprising said second resistor and said capacitor.

18. A control circuit according to claim 16 wherein the resistance of said first resistor is small enough so that the time constant for charging said capacitor is such as to maintain the voltage across said capacitor at least equal to said minimum threshold voltage, and the resistance of said second resistor is large enough so that the time required to discharge said capacitor is much greater than one-half cycle of said AC voltage.

References Cited

UNITED STATES PATENTS

| 3,185,850 | 5/1965 | Terlet | 307—311 X |
| 3,320,438 | 5/1967 | Myers | 307—311 X |
| 3,342,998 | 9/1967 | Crusinberry | 250—214 X |
| 2,838,719 | 6/1958 | Chitty | 315—150 X |

JAMES W. LAWRENCE, Primary Examiner.

C. R. CAMPBELL, Assistant Examiner.

U.S. Cl. X.R.

315—155, 157, 156; 250—214, 217, 220; 317—148.5; 307—284, 311